June 16, 1953  M. A. ORFITELLI  2,642,009
MEANS FOR MAKING ICE CREAM
Filed Oct. 5, 1949
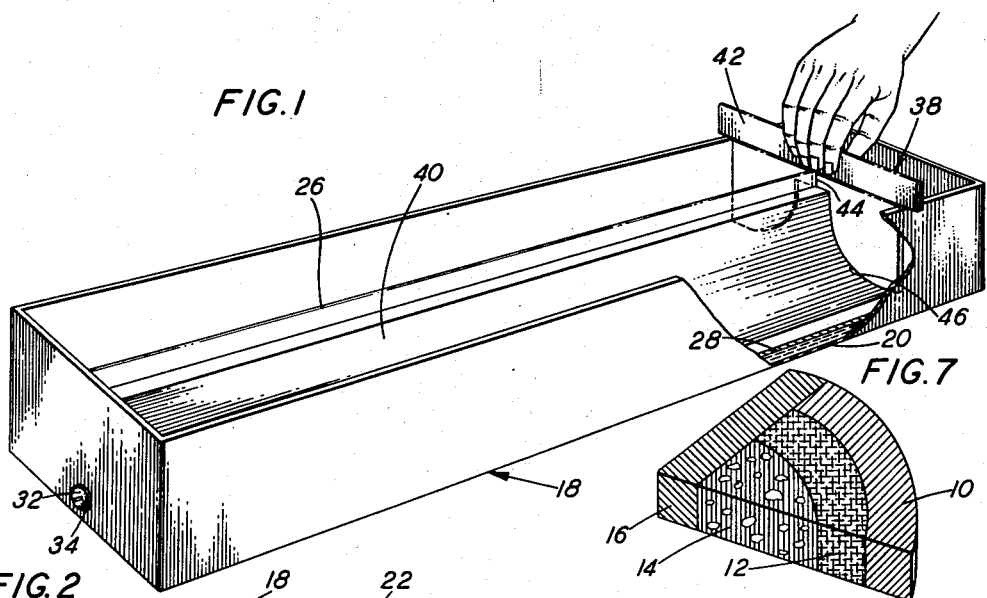
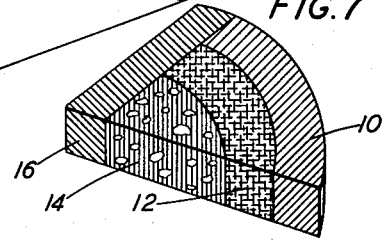
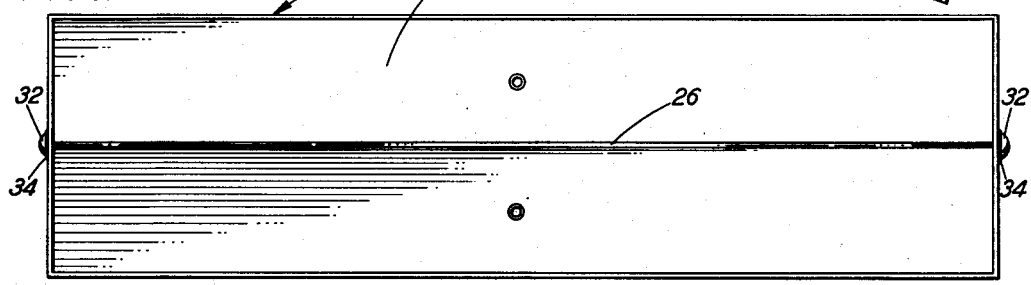
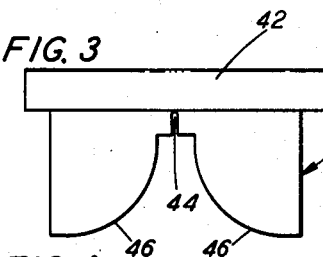
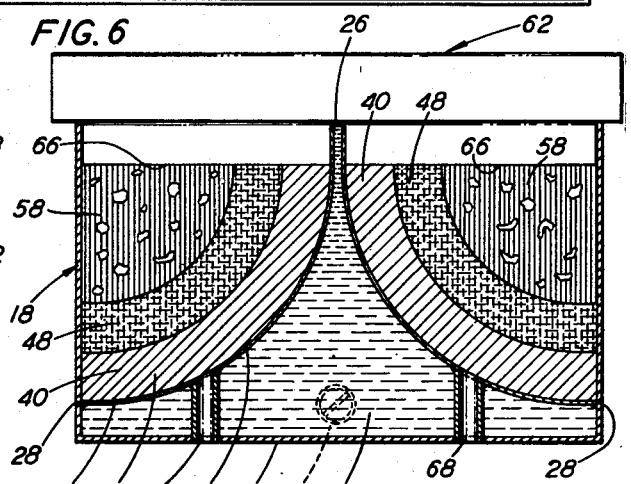
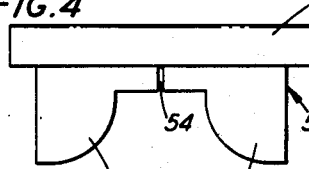
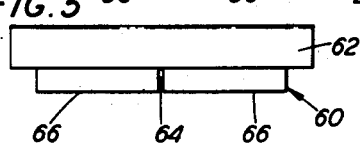
INVENTOR
MICHAEL A. ORFITELLI
BY *Lindsey, Protzman and Just*
ATTORNEYS Patented June 16, 1953

2,642,009

UNITED STATES PATENT OFFICE 2,642,009

MEANS FOR MAKING ICE CREAM

Michael A. Orfitelli, Manchester, Conn.

Application October 5, 1949, Serial No. 119,585

1 Claim. (Cl. 107—1)

This invention relates to improvements in a means for making ice cream and, more particularly, to making ice cream known as spumone.

Conventional spumone ice cream is made in shapes which are somewhat dome-like and consist of a plurality of adhering layers of different flavored ice cream. The innermost layer is first made manually in a suitable mold. After it is frozen a second layer is manually added thereto and subsequently frozen. Still another layer is then added manually to the previously made composite form and subsequently frozen. Thus, the operations used in making these handmade forms of spumone have heretofore been tedious, time consuming, expensive due to the manual labor involved, and frequently unsanitary.

It is an object of the present invention to provide a mold and a method of using the mold so that multi-layered spumone type ice cream may be quickly, inexpensively, and sanitarily molded and frozen in elongated bars or blocks so that the resulting product may be transversely sliced into individual portions which closely resemble the handmade product as far as the multi-layered construction is concerned. However, by using this improved mold and method slices or portions of spumone may be formed so as to have uniform thicknesses and thus be more attractive than the conventional product which is generally served in the form of segments cut from the dome-shaped block referred to above.

Still another object of the present invention is to provide shaping or scraping implements to be used with the mold, whereby uniform layers may be provided in the multi-layered ice cream product so that the product will be consistently the same regardless of the quantity manufactured while using the mold and method embodied in the present invention.

Still another object of the invention is to provide a mold and method which requires a minimum of manual operations and the mold and implements used therewith may be thoroughly and readily cleansed after using, whereby the apparatus, method and product are highly sanitary.

Details of the invention and the foregoing objects, as well as other objects of the invention, are set forth in the accompanying drawing forming a part thereof.

In the drawing:

Fig. 1 is a perspective view of the mold and one of the shaping implements shown in use therewith, part of the mold being broken away to better illustrate details of the mold and method.

Fig. 2 is a top plan view of the mold per se.

Figs. 3, 4 and 5, respectively, are plan views of several shaping or scraper implements used with the mold for forming the several layers of the multi-layer product.

Fig. 6 is a sectional view taken transversely through the mold when the last curved layer is being formed, the several previously formed layers being illustrated in their respective positions in the resulting product.

Fig. 7 is a perspective view of a serving of spumone type ice cream sliced from one of the elongated blocks of ice cream formed by the mold and method comprising the present invention, said figure being shaded to indicate different flavors and colors of ice cream embodied in the composite product.

The present invention comprises apparatus and a method for making a multi-layer composite block or bar of spumone type ice cream, a slice of which is illustrated in Fig. 7. Said product is less expensive to produce than the conventional handmade product due to the minimizing of manual operations and yet the product has a quality highly comparable to or identical with the conventional handmade spumone product. The appearance of the product is also basically similar to the conventional handmade product in that a plurality of curved layers of ice cream are adhered to each other. However, the present product is an improvement over the conventional in that individual servings thereof are more attractive since the layers comprising each individual serving, as illustrated in Fig. 7, are of substantially uniform thicknesses and the elongated bars or blocks of the product may be sliced into said individual servings without waste and in such manner that individual servings may be exactly uniform in size.

The exemplary individual serving shown in Fig. 7 consists of a plurality of different flavors of ice cream, all but one of which are curved in shape in the example shown. The outermost curved layer 10 in the exemplary product may be formed from chocolate ice cream mix, the second curved layer 12 from vanilla ice cream mix, and the third or innermost curved layer 14 from a whipped cream mix in which fruits and nuts are embodied, the same being quite rich in composition. To this composite arrangement of curved layers is added at one side edge thereof a substantially straight capping layer 16 of still another flavored ice cream mix which, for example, may be pistachio.

The mold and implements used for purposes of forming this composite multi-layered product of different flavors of ice cream is illustrated in Figs. 1 through 6. Said mold is one exemplary embodiment of several which may be used, the same having curved surfaces for purposes of producing the curved-layer composite product. In this particular embodiment, a generally rectangular elongated molding pan 18 is provided, the same preferably having side walls extending upward from and integral with a bottom 20. The mold is preferably formed so as to permit the manufacture simultaneously of a plurality of composite elongated bars of the product which, in cross-section, are approximately a quarter segment of a circle in shape. To accomplish this, a molding partition 22 is formed so as to have a plurality of curved walls 24 which are interconnected by an upwardly extending bent portion 26 which extends lengthwise of the pan 18, the bent portion preferably having the same height as the upper edges of the sides of the pan 18. Said bent portion also has a guiding function as will be described hereinafter. The side edges 28 of the molding partition 22 are connected to the side walls of the pan 18 in any suitable manner such as by soldering, whereby the convex inner surfaces of the partition 22 cooperate with the bottom 20 of the pan and the lower portions of the sides of the pan 18 to define a closed compartment in which a coolant solution is disposed. The ends of the partition 22 are also connected to the ends of the pan 18 by soldering or otherwise. Said ends are also provided with openings 30 which are closed by any suitable means such as a screw plug 32 having a sealing washer 34 formed from rubber or otherwise for purposes of retaining the coolant within the compartment 36.

When spumone type ice cream is to be molded within the mold illustrated herein, the compartment 36 is filled with a suitable coolant such as, for example, calcium chloride brine. The brine may either be at a very low temperature at the time it is introduced into the compartment, or if the compartment 36 is filled with brine not at a low temperature, the mold and brine may be put in a chilling room so that the temperature of the brine and mold may be reduced to suitable freezing temperature of the order of somewhere between zero° and minus 15° F.

The very cold mold is then partially filled with semi-frozen ice cream mix of any desired flavor such, for example, as chocolate. Both of the molding compartments of the mold are partially filled with said ice cream mix, the same being of a consistency that it may be spread with ease but the same will preferably not readily flow. The scraper blade 38 shown in Fig. 3 is then used for purposes of forming curved layers 40 of uniform thicknesses of the exemplary chocolate ice cream mix adjacent the concave surfaces of the partition 22 on opposite sides of the bent portion 26 thereof. The scraper blade 38 has a transverse handle and guide member 42 at the top thereof, said member 42 being longer than the width of the pan 18, whereby the ends of the handle engage the top edges of the sides of the pan 18, as shown in Fig. 6, for purposes of guiding the scraper blade 38 relative to the mold pan. Intermediate the edges of the blade, a slot 44 is provided for purposes of engaging the bent portion 26 of the partition 22 so as to also aid in guiding the scraper blade relative to the mold pan. The curved lower edges 46 of the scraper blade 38 are so shaped that they are complementary to the concave sides of the curved walls 24 of the partition 22 but are uniformly spaced a predetermined distance from said concave surfaces so that when moved longitudinally of the mold pan, the curved edges 46 of the scraper blade will form respectively two curved layers 40 of ice cream of uniform thickness in the mold compartments.

The temperature of the surfaces of the partition 22 engaged by layers 40 will be considerably lower than the temperature of the ice cream mix introduced into the molds, whereby the ice cream mix will substantially instantly adhere to the much colder surfaces of the curved walls 24. Thus, the ice cream layers 40 will not move relative to the concave surfaces of said walls 24 as the scraper blade is moved longitudinally of the molding pan. However, the excess ice cream mix will be moved along by the scraper in front of the latter and the excess may be readily removed from the end of the mold where the scraping operation is completed.

The molding pan and these initial layers 40 of ice cream are then placed in the chilling room so that the latter will quickly freeze to solid form. The intermediate or second layers 48 of a different flavor of semi-frozen ice cream mix are next introduced on top of the previously frozen layers 40 and will quickly and firmly adhere to the upper curved surfaces of the layers 40 due to the low temperature thereof resulting from being placed in the chilling room. A second scraper blade 50 such as shown in Fig. 4 is then moved along the top of the mold pan for purposes of shaping the second layers 48 of ice cream into curved layers of uniform thickness as illustrated in Figs. 6 and 7. The scraper 50 is also provided with a handle and guide member 52 similar to the member 42 of the scraper 38, the functions thereof also being similar to those of the member 42. The blade is provided intermediate its edges with a slot 54 which engages the curved portion 26 of the partition 22. The curved edges 56 of the scraper blade 50 are also complementary to the concave curved surfaces of the layers 40 and partition 22 but said edges 56 are spaced from the concave surfaces of the layers 40 a distance sufficient to form the desired thickness of layers 48 as the scraper blade is moved along the mold from one end to the other. The excess ice cream from forming the second layers is then easily removed from the end of the mold where the scraping is completed. The mold and plurality of layers 40 and 48 are again placed in a chilling room where the layers 48 are quickly frozen into solid condition.

Third layers 58 of semi-frozen ice cream mix of a still different flavor are next introduced on top of the concave surfaces of the second layers 48 which have previously been solidly frozen. The spreadable mix for forming the layers 58 firmly adheres to the very cold concave surfaces of the layers 48 and a third scraper blade 60, shown in Figs. 5 and 6, is used to evenly spread the third ice cream mix on the curved layers 48 by moving the scraper 60 from one end of the mold to the other. This scraper 60 is also provided with a handle and guide member 62 which is similar in shape and function to the handle members 42 and 52. The scraper blade 60 is provided intermediate its ends with a slot 64 which is also engageable with the curved portion 26 of the partition 22 as the scraper is moved along the molding pan. However, the lower edges 66 of the scraper blade 60 are preferably parallel to the handle 62, whereby, as the scraper blade 60 is moved along the mix which forms the third layers 58, a flat surface will be produced on top of said third layers which is in the same plane as the upper edges of the layers 40 and 48 which have previously been formed, as is evident from Fig. 6. The mold with its composite layers is again placed in the chilling room to solidify the third layers 48. The layers 40, 48 and 58, respectively, correspond to the layers 10, 12 and 14 of the product shown in Fig. 7.

After the curved layers 40, 48 and 58 are frozen into adherence to form solid elongated bars, a pair of fourth layers of semi-frozen ice cream mix of a still different flavor may be introduced on top of the previously frozen curved layers until said fourth layers are substantially even with the top edges of the molding pan 18 and the curved portion 26 of the partition 22. These fourth layers may be rendered smooth and even on their tops by drawing any convenient straight edge along the mold. The upper edge of the handle of any of the scraper blades 38, 50 or 60 may be used for this purpose. The fourth layers will readily adhere to the very cold upper surfaces of the other three curved layers and the excess is removed from the top of the mold. The mold is again introduced into the chilling room wherein the fourth layers will be quickly and smoothly frozen into adherence with the three curved layers of each of the composite bars of ice cream.

After this has been accomplished, the exemplary frozen composite elongated bars are then readily removed from the mold by dipping the molds in warm water to warm the sides of the mold pan so that the frozen bars may be easily dumped from the mold. This operation will be enhanced by first removing the chilled brine from the compartment 36 so that warm water may enter the compartment and engage the inner surfaces of the partition 22. Extending through the compartment 36 and connected at their ends to the curved walls 24 of the partition 22 and the bottom 20 of the mold pan are a plurality of tubes 68. These tubes serve to admit air between the frozen composite bars of ice cream and the concave surfaces of the walls 24 thus relieving suction so as to facilitate the emptying of the bars of frozen ice cream from the mold pan. As shown in Fig. 6, the ends of the tubes 68 extend through the bottom 20 and the curved walls 24, but said ends are sealed by soldering or otherwise relative to said curved walls and bottom to prevent the admission of brine into the spaces in which bars of ice cream are molded.

After the frozen composite bars of ice cream are removed from the mold, they may be readily sliced transversely into any size of individual servings which are desired. By molding the ice cream into composite bars, it will be seen that the formation of different sized portions may be readily accomplished simply by slicing the portions into any thickness desired.

It will thus be seen that the present invention provides a simple, effective, and sanitary mechanism and method of forming composite bars of spumone type ice cream which may be sliced into individual portions having a plurality of curved layers of different flavors of ice cream which are adhered together by freezing and also adhered to a capping layer which enhances the appearance of the product.

The mechanism and method comprising the present invention permits commercial production of a spumone type ice cream on an extensive scale, thus reducing the production costs tremendously as compared with the conventional hand methods of making individual dome-shaped bodies of spumone ice cream. However, the reduction in the cost production of the ice cream in no way detracts from the quality of the spumone ice cream, and individual servings of the resulting product are uniform and regular in size and appearance, thus adding to the desirability of the product.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

A mold for making simultaneously a plurality of blocks of ice cream each comprising a plurality of adjoining arcuate layers of different flavors of ice cream, said mold comprising an elongated pan having a bottom, side walls and ends perpendicular thereto, a partition extending upward from said bottom and engaging said side walls and ends, said partition being shaped to form a plurality of adjacent arcuate walls cooperating with the sides and ends of said pan to define a plurality of molding compartments and also cooperating with the bottom of said mold to define a coolant compartment, said partition having a longitudinally and centrally disposed bent portion forming a guide rib, and a substantially flat scraper blade provided with an upwardly directed slot cooperable with said rib to aid in guiding said scraper blade, said scraper blade having arcuate edges extending into said molding compartments complementary to the arcuate walls of said partition and having straight edges adjacent said side walls, said arcuate edges of said scraper blade being spaced a predetermined distance from said arcuate walls, whereby when said scraper is moved longitudinally within said molding compartments it will form a layer of ice cream having a desired thickness within said molding compartments.

MICHAEL A. ORFITELLI.

References Cited in the file of this patent

UNITED STATES PATENTS

| Number | Name | Date |
|---|---|---|
| 545,294 | Hunter | Aug. 27, 1895 |
| 609,025 | Harris | Aug. 16, 1898 |
| 1,607,970 | Thompson | Nov. 23, 1926 |
| 1,849,457 | Johns | Mar. 15, 1932 |
| 1,948,147 | Warren | Feb. 20, 1934 |
| 1,955,817 | Marchiony | Apr. 24, 1934 |
| 2,052,510 | Woolverton | Aug. 25, 1936 |
| 2,087,729 | Cowling | July 20, 1937 |
| 2,168,389 | Bemis | Aug. 8, 1939 |
| 2,186,335 | Halpern | Jan. 9, 1940 |